United States Patent
Horiuchi et al.

(10) Patent No.: US 8,804,601 B2
(45) Date of Patent: Aug. 12, 2014

(54) WIRELESS COMMUNICATION DEVICE, SIGNAL RELAY METHOD, AND SIGNAL ALLOCATION METHOD

(75) Inventors: Ayako Horiuchi, Kanagawa (JP); Seigo Nakao, Kanagawa (JP); Yasuaki Yuda, Kanagawa (JP); Daichi Imamura, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 98 days.

(21) Appl. No.: 13/384,846

(22) PCT Filed: Aug. 4, 2010

(86) PCT No.: PCT/JP2010/004912
§ 371 (c)(1),
(2), (4) Date: Jan. 19, 2012

(87) PCT Pub. No.: WO2011/016232
PCT Pub. Date: Feb. 10, 2011

(65) Prior Publication Data
US 2012/0120867 A1 May 17, 2012

(30) Foreign Application Priority Data
Aug. 5, 2009 (JP) .................................. 2009-182527

(51) Int. Cl.
H04B 7/14 (2006.01)
H04W 28/10 (2009.01)
H04B 7/155 (2006.01)
H04W 84/04 (2009.01)
H04L 1/18 (2006.01)
H04L 1/00 (2006.01)

(52) U.S. Cl.
CPC ............ *H04W 28/10* (2013.01); *H04W 84/047* (2013.01); *H04L 1/1829* (2013.01); *H04L 1/0041* (2013.01); *H04L 1/1867* (2013.01); *H04L 2001/0097* (2013.01); *H04B 7/155* (2013.01)
USPC ........................................................ 370/315

(58) Field of Classification Search
USPC ................. 370/252, 281, 312, 315, 329, 404; 375/211, 295; 455/25, 449
See application file for complete search history.

(56) References Cited

U.S. PATENT DOCUMENTS

| 7,991,400 B2 | 8/2011 | Ito et al. |
| 2008/0013558 A1* | 1/2008 | Ito et al. ........................ 370/404 |

(Continued)

FOREIGN PATENT DOCUMENTS

| JP | 2008-22089 A | 1/2008 |
| WO | 2007/143753 A2 | 12/2007 |

OTHER PUBLICATIONS

3GPP TSG-RAN1 #56Bis, Seoul, Korea, Mar. 23-27, 2009, R1-091506, Fujitsu, "Discussion on Backhaul link of Type-1 Relay for LTE-A TDD".

(Continued)

*Primary Examiner* — Andrew Chriss
*Assistant Examiner* — John Lequang
(74) *Attorney, Agent, or Firm* — Pearne & Gordon LLP

(57) ABSTRACT

To flexibly change subframes of a backhaul link and an access link. A wireless communication device according to the present invention is for relaying a signal between a base station and a mobile station, including: a receiver that receives the signal from the base station or the mobile station; a transmitter that transmits the signal to the base station or the mobile station; and a changeover unit that switches an operation mode to a receiving mode for receiving the signal from the base station or the mobile station, or a transmitting mode for transmitting the signal to the base station or the mobile station, wherein the changeover unit switches from the transmitting mode to the receiving mode in a subframe set to an MBSFN subframe by the wireless communication device among subframes subsequent to a subframe in which a NACK for requiring retransmission by the base station is transmitted.

7 Claims, 13 Drawing Sheets

(56) References Cited

U.S. PATENT DOCUMENTS

| | | |
|---|---|---|
| 2008/0019307 A1 | 1/2008 | Tenny et al. |
| 2008/0025240 A1 | 1/2008 | Casaccia et al. |
| 2010/0271999 A1* | 10/2010 | Yu et al. ......................... 370/312 |
| 2010/0316096 A1* | 12/2010 | Adjakple et al. .............. 375/211 |
| 2011/0090983 A1* | 4/2011 | Zhang et al. .................. 375/295 |
| 2011/0103291 A1* | 5/2011 | Wiberg et al. ................. 370/315 |
| 2011/0164542 A1* | 7/2011 | Cai et al. ....................... 370/312 |
| 2011/0299452 A1* | 12/2011 | Seo et al. ...................... 370/315 |
| 2012/0069795 A1* | 3/2012 | Chung et al. .................. 370/315 |
| 2013/0033998 A1* | 2/2013 | Seo et al. ...................... 370/252 |

OTHER PUBLICATIONS

Further Advancements for E-UTRA Physical Layer Aspects, 3GPP TR36.814 V0.4.1, 3GPP, Feb. 2009, p. 9-10.

International Search Report for PCT/JP2010/004912 dated Oct. 26, 2010.

* cited by examiner

US 8,804,601 B2

WIRELESS COMMUNICATION DEVICE, SIGNAL RELAY METHOD, AND SIGNAL ALLOCATION METHOD

TECHNICAL FIELD

The present invention relates to a wireless communication device, a signal relay method, and a signal allocation method.

BACKGROUND ART

In recent years, in a cellular mobile communication system, with the advance of multimedia of information, the transmission of not only audio data, but also large-capacity data such as still image data or moving image data is being generalized. In order to realize the transmission of the large-capacity data, a technique for realizing a high transmission rate by using a high-frequency radio band has been being actively studied. However, when the high-frequency radio band is used, the transmission rate can be expected at a short distance whereas attenuation caused by a transmission distance is increased toward a longer distance. Hence, when a mobile communication system using the high-frequency radio band is really operated, a coverage area of a wireless communication base station device (hereinafter referred to as "base station") is reduced, as a result of which there is required that a larger number of base stations are installed. Because the installation of the base station is reasonably expensive, a technique for realizing the communication service using the high-frequency radio band while suppressing an increase in the number of base stations has been strongly demanded.

To meet the above demand, in order to enlarge the coverage area of each base station, as illustrated in FIG. 13, a relay transmission technique has been studied in which a wireless communication relay station device 20 (hereinafter referred to as "relay station 20") is installed between a base station 10 and a wireless communication mobile station device 2 (hereinafter referred to as "mobile station 2"), and communication (indicated by arrows C and D in FIG. 13) between the base station 10 and the mobile station 2 is conducted through the relay station 20. With the use of the relay technology, a terminal (mobile station) that cannot communicate directly with the base station 10 can also communicate with the base station 10 through the relay station 20.

[Description of TD Relay]

In a TD relay, in a down link (DL), transmission from the base station 10 to the relay station 20 and transmission from the relay station 20 to the mobile station 2 are divided in time domain. Also, in an up link (UL), transmission from the mobile station 2 to the relay station 20 and transmission from the relay station 20 to the base station 10 are divided in time domain. In this way, the communication of a backhaul between the base station and the relay station, and the communication of an access link between the relay station 20 and the mobile station 2 are divided on a time axis so that a transmission time and a reception time of the relay station 20 can be divided. Accordingly, the relay station 20 can perform relay without being affected by loop-back between a transmission antenna and a reception antenna.

[Use of MBSFN Subframe]

In an LTE-A, in order to keep a mutual compatibility with the LTE, setting an MBSFN subframe at the time of transmission from the base station to the relay station in the DL has been studied. However, since the LTE mobile station has no function of receiving MBMS data, the mobile station receives only a control signal part, and ignores a data part other than the control signal part, in the MBSFN subframe. There is a possibility that the MBMS data is transmitted from a plurality of base stations. For that reason, there is a possibility that the LTE mobile station cannot accurately measure a reception quality of the base station connected with the subject mobile station. Accordingly, the LTE mobile station does not measure the reception quality in the MBSFN subframe.

Under the circumstances, the LTE mobile station sets a subframe that communicates with the base station as the MBSFN subframe in a cell of the relay station by using a feature that the mobile station does not receive the data part of the MBSFN subframe. With this configuration, the mobile station connected to the relay station can be prevented from measuring the reception quality in spite of no transmission in the subframe stopping the transmission because the relay station receives a signal from the base station.

As the MBSFN subframe used for the backhaul, there is used a subframe for really transmitting the MBMS data, or the MBSFN subframe other than subframes used for other purposes such as a CoMP or a positioning support.

Subsequently, a description will be given of a setting example of the MBSFN subframe with reference to FIG. 14. In FIG. 14, a mobile station 1 is a mobile station connected to the base station 10, and the mobile station 2 is a mobile station connected to the relay station 20. The relay station 20 sets a subframe #1 and a subframe #8 to an MBSFN subframe, and uses those subframes for transmission from the base station 10 to the relay station 20.

As illustrated in FIG. 14, the mobile station 1 can receive signals from the base station 10 by all of the subframes. Also, the mobile station 2 receives data from the relay station 20 by a subframe #0, a subframe #2, a subframe #3, a subframe #4, a subframe #5, a subframe #6, a subframe #7, and a subframe #9 other than a subframe #1 and a subframe #8 that are the MBSFN subframes. Further, the relay station 20 receives data from the base station 10 in the subframe #1 and the subframe #8 set to the MBSFN, and transmits data to the mobile station 2 by the other subframes.

Accordingly, a ratio of the number of subframes (the subframe #1 and the subframe #8) in backhaul to the number of subframes (subframes other than the subframe #1 and the subframe #8) in an access link of the relay station 20 is 2:8.

CITATION LIST

Patent Literature

Patent Literature 1: JP-A-2008-022089

Non-Patent Literature

Non-Patent Literature 1: 3GPP TR 36.814 V1. 1. 1, "Further advancements for E-UTRA physical layer aspects"

SUMMARY OF INVENTION

Technical Problem

However, the ratio of the number of subframes in the backhaul link to the number of subframes in the access link of the relay station 20 is determined according to the number of subframes that is allocated to the backhaul among the number of MBSFN subframes to be set. Under the circumstances, in order to change the number of MBSFN subframes that are allocated to the backhaul according to traffic of the backhaul and the access link, the base station 10 must notify the relay station 20 of the position of the MBSFN subframe and the position of the backhaul subframe by a higher-level control signal. For that reason, there arises such a problem that timing of changing the MBSFN subframe is limited. In particular, in 3GPP LTE, the position of the MBSFN subframe is notified of by an SIB (system information block), and therefore the ratio of the subframes between the backhaul link and the access link can be changed by only the change timing of SIB.

An object of the present invention is to provide a wireless communication device that flexibly changes the subframes of the backhaul link and the access link.

Solution to Problem

The present invention provides a wireless communication device for relaying a signal between a base station and a mobile station, the wireless communication device including: a receiver that is configured to receive the signal from the base station or the mobile station; a transmitter that is configured to transmit the signal to the base station or the mobile station; and a changeover unit that is configured to switch an operation mode to a receiving mode for receiving the signal from the base station or the mobile station, or a transmitting mode for transmitting the signal to the base station or the mobile station, wherein the changeover unit is configured to switch the operation mode from the transmitting mode to the receiving mode in a subframe set to an MBSFN subframe by the wireless communication device among subframes subsequent to a subframe in which a NACK for requiring retransmission by the base station is transmitted.

The present invention also provides a wireless communication device that communicates with a mobile station through a relay station, the wireless communication device including: a receiver that is configured to receive a signal from the relay station or the mobile station; and an allocation unit that is configured to allocate a signal directed to the relay station in a subframe set to an MBSFN subframe by the relay station among subframes subsequent to a subframe in which the wireless communication device receives a NACK for requiring retransmission from the relay station.

The present invention also provides a signal relay method for relaying a signal between a base station and a mobile station, the signal relay method including: switching from a transmitting mode for transmitting the signal to the base station or the mobile station to a receiving mode for receiving the signal from the base station or the mobile station in a subframe set to an MBSFN subframe among subframes subsequent to a subframe in which a NACK for requiring retransmission by the base station is transmitted.

The present invention also provides a signal allocation method for communicating with a mobile station through a relay station, the signal allocation method including: allocating a signal directed to the relay station in a subframe set to an MBSFN subframe by the relay station among subframes subsequent to a subframe in which a NACK for requiring retransmission from the relay station is received.

Advantageous Effects of Invention

According to the wireless communication device, the signal relay method, and the signal allocation method of the present invention, the subframes of the backhaul link and the access link can be flexibly changed.

DESCRIPTION OF EMBODIMENTS

Hereinafter, embodiments of the present invention will be described with reference to the drawings.

First Embodiment

In this embodiment, in a cell generated by a relay station, the number of MBSFN subframes is set to be larger than the number of subframes really used in a backhaul. With this setting, the number of subframes that can be selected for the backhaul can be increased. Also, the subframes that are set to the MBSFN subframes by the relay station, but not used as the backhaul are allocated to a mobile station of an LTE-A. With this allocation, the subframes set to the MBSFN subframes can be effectively used.

Figure 1:
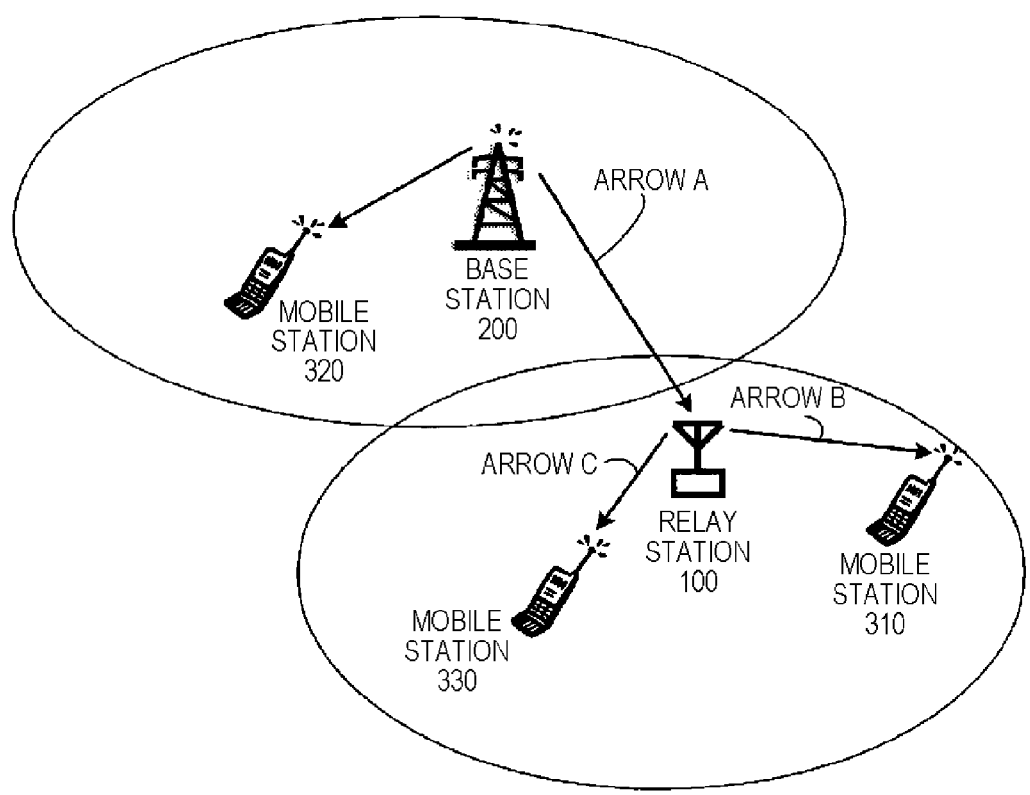
FIG. 1 is a diagram illustrating a wireless relay system according to a first embodiment.

Subsequently, a wireless relay according to a first embodiment will be described with reference to FIGS. 1 to 3. FIG. 1 is a diagram illustrating a wireless relay system according to the first embodiment. In the wireless relay system illustrated in FIG. 1, a relay station 100 is installed between a base station 200 and mobile stations, and communications (arrows A, B, and C in FIG. 1) between the base station 200 and mobile stations 310, 330 are conducted through the relay station 100.

In the wireless relay system illustrated in FIG. 1, a time division relay (TD relay) in which a communication of the backhaul and a communication of an access link of the relay are divided on a time axis is assumed.

In the wireless relay system illustrated in FIG. 1, the communication is conducted by frequency division multiplexing (FDD).

In the wireless relay system illustrated in FIG. 1, a two-hop relay in which data is transmitted from the base station 200 through the relay station 100 to the mobile stations 310 and 330 is assumed.

In the wireless relay system illustrated in FIG. 1, a mobile station 320 is a mobile station that is connected to the base station 200, and the mobile stations 310 and 330 are mobile stations that are connected to the relay station 100. It is assumed that the mobile station 310 is an LTE mobile station, and the mobile station 330 is an LTE-A mobile station.

Subsequently, a description will be given of the operation of the relay station 100 according to this embodiment with reference to FIG. 2. FIG. 2 is a diagram illustrating a setting example of the subframe in the wireless relay system illustrated in FIG. 1. As illustrated in FIG. 2, a frame in the wireless relay system is configured in the subframes #0 to #9. Also, arrows illustrated in FIG. 2 indicate subframes of the respective stations which are destinations of signals transmitted from the respective stations. That is, the arrows in FIG. 2 indicate the operation of transmission and reception on the downlink (DL), of the base station 200, the relay station 100 connected to the base station 200, the mobile station 320 of the LTE connected to the relay station 100, and the mobile station 330 of the LTE-A.

The positional information on subframes set to the MBSFN subframe by the relay station 100 is shared between the base station 200 and the relay station 100. The base station 200 notifies the relay station 100 of the subframes used for the backhaul among the subframes set to the MBSFN subframes by the relay station 100. The relay station 100 receives the signals from the base station 200 in the subframes that are instructed to be used as the subframes of the backhaul from the base station 200, and transmits the signal toward the mobile station 330 by the MBSFN subframes not used as the backhaul.

Figure 2:
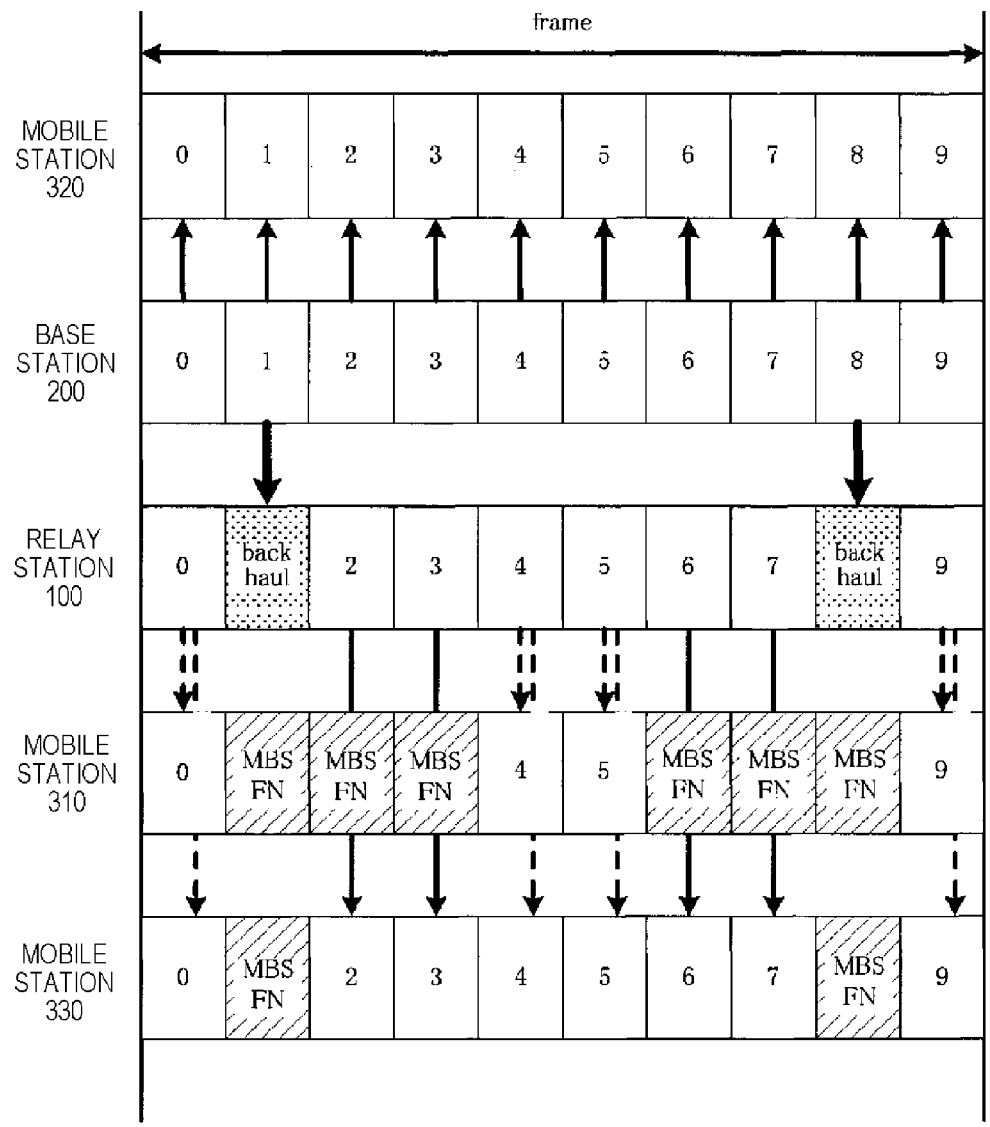
FIG. 2 is a diagram illustrating a setting example of a subframe in a downlink (DL) of the wireless relay system illustrated in FIG. 1.
Figure 3:
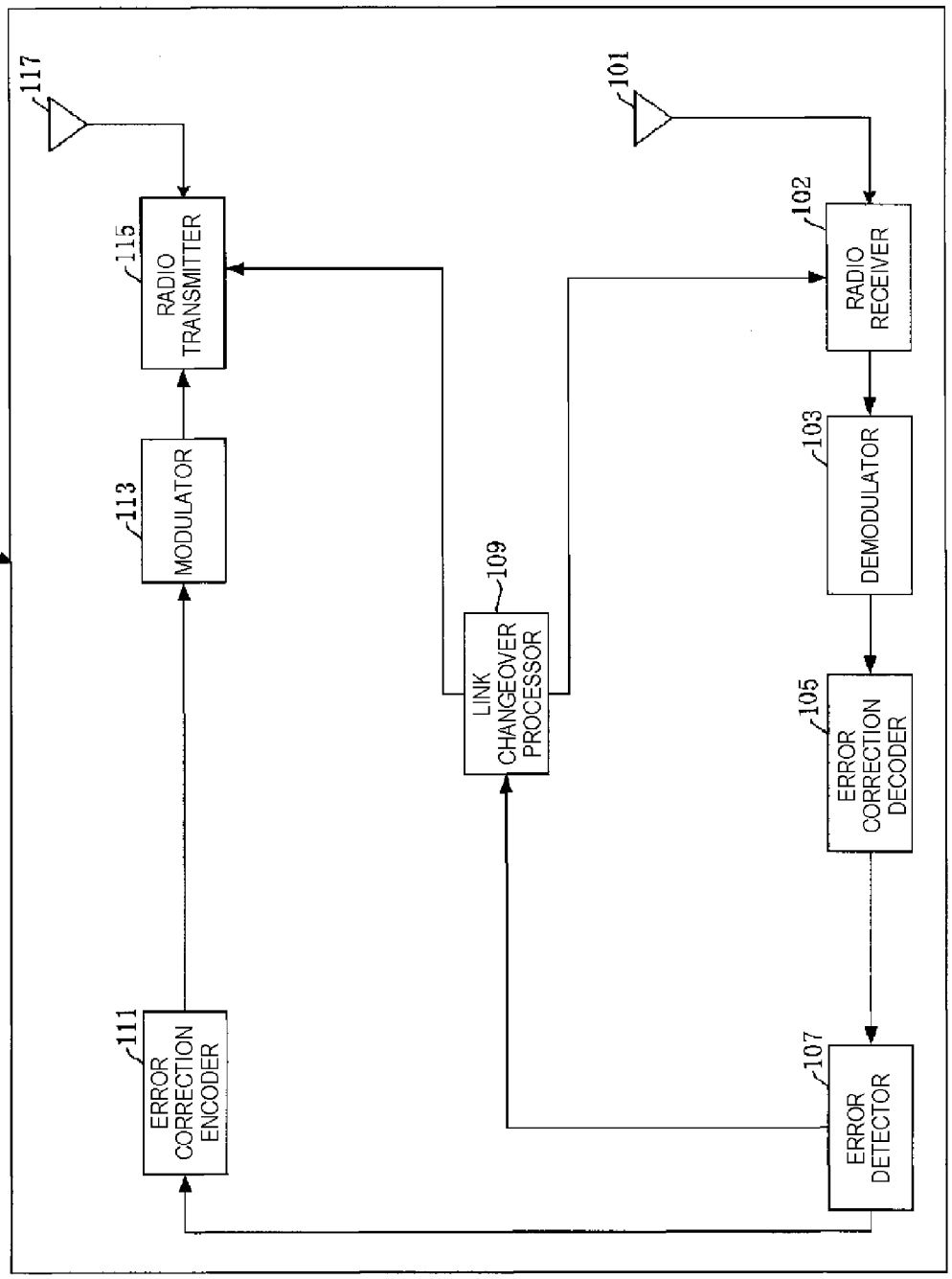
FIG. 3 is a block diagram illustrating a configuration of a relay station 100 according to the first embodiment.

As illustrated in FIG. 2, the relay station 100 sets the subframe #1, the subframe #2, the subframe #3, the subframe #6, the subframe #7, and the subframe #8 as the MBSFN subframes. Among them, the base station 200 sets the subframe #1 and the subframe #8 as the backhaul, and notifies the relay station 100 of this fact. For that reason, the relay station 100 can transmit the signals to the mobile station 310 that is an LTE mobile station or the mobile station 330 that is an LTE-A mobile station in the subframe #0, the subframe #4, the subframe #5, and the subframe #9 which are not set to the MBSFN subframes.

The relay station 100 receives the signals from the base station 200 in the subframe #1 and the subframe #8 which are set to the backhaul among the subframe #1, the subframe #2, the subframe #3, the subframe #6, the subframe #7, and the subframe #8 which are set to the MBSFN subframes. Also, the relay station 100 transmits the signals toward the mobile station 330 which is an LTE-A mobile station in the subframe #2, the subframe #3, the subframe #6, and the subframe #7 which are not set to the backhaul among the subframe #1, the subframe #2, the subframe #3, the subframe #6, the subframe #7, and the subframe #8 which are set to the MBSFN subframes.

As described above, since the mobile station 330 connected to the relay station 100 is the LTE-A mobile station, the mobile station 330 has a possibility of receiving the signals from the relay station 100 even in the subframe #2, the subframe #3, the subframe #6, and the subframe #7 which are not used as the backhaul by the relay station 100 among the subframes which are set to the MBSFN subframes. For that reason, the mobile station 330 receives control signals even in the subframe #2, the subframe #3, the subframe #6, and the subframe #7 which are not used as the backhaul by the relay station 100 among the subframes which are set to the MBSFN subframes. The mobile station 330 determines whether there is an allocation to the mobile station 330, or not, and receives a signal if there is the allocation.

In this example, when the base station 200 changes the subframes used for the backhaul, and notifies the relay station 100 of information on the changed subframes used for the backhaul, the base station 200 selects the subframes to be changed among the subframe #1, the subframe #2, the subframe #3, the subframe #6, the subframe #7, and the subframe #8 which are set to the MBSFN subframes by the relay station 100, and notifies the relay station 100 of, for example, Nos. of the subframes to be changed. Upon receiving a notification of the subframes to be changed from the base station 200, the relay station 100 stops allocating the mobile station 330 that is the LTE-A mobile station to the appropriate subframes, and receives the signals from the base station 200 with the appropriate subframes as the backhaul.

Also, although not shown, the relay station 100 transmits a control signal part to the mobile station 310 or the mobile station 330 which is connected to the relay station 100 even if the MBSFN subframes are used for the backhaul. The relay station 100 transmits allocation information on the downlink (DL) toward the mobile station 330 of the LTE-A by the control signal part, as a result of which the mobile station 330 that is the LTE-A mobile station can determine whether there is a signal addressed to the relay station 100, or not, even by the MBSFN subframes.

A configuration of the relay station 100 according to the first embodiment will be described with reference to FIG. 1. FIG. 3 is a block diagram illustrating the configuration of the relay station 100 according to the first embodiment. The relay station 100 illustrated in FIG. 3 includes a reception antenna 101, a radio receiver 102, a demodulator 103, an error correction decoder 105, an error detector 107, a link changeover processor 109, an error correction encoder 111, a modulator 113, a radio transmitter 115, and a transmission antenna 117.

The radio receiver 102 receives a signal from the base station 200 through the reception antenna 101, subjects the signal to radio processing such as down converting, and outputs the converted signal to the demodulator 103.

The demodulator 103 demodulates the signal subjected to the radio processing by the radio receiver 102, and outputs the demodulated signal to the error correction decoder 105.

The error correction decoder 105 decodes the signal demodulated by the demodulator 103, and outputs the demodulated signal to the error detector 107.

The error detector 107 detects whether there is an error in the signal decoded by the error correction decoder 105, or not, and outputs an error detection result to the link changeover processor 109. Also, the error detector 107 stops relaying the signal if the error is detected, and outputs the signal to the error correction encoder 111 if no error is detected.

The link changeover processor 109 conducts link changeover processing in order to use, as the backhaul, the subframes notified of from the base station 200 among the MBSFN subframes on the basis of positional information on the subframes set to the MBSFN subframes which is shared by the base station 200. Also, the link changeover processor 109 generates a signal for notifying the base station 200 of the MBSFN subframes used as the backhaul through the link changeover processing, and outputs the signal to the radio transmitter 115. Through this changeover processing, the relay station 100 receives the signals from the base station 200 in the subframes that are instructed to be used as the subframes of the backhaul from the base station 200, and transmits the signals toward the mobile station 330 by the MBSFN subframes not used as the backhaul. Accordingly, the relay station 100 can easily change a ratio of the backhaul and the access link.

The error correction encoder 111 subjects the signal to error correction encoding, and outputs the encoded signal to the modulator 113.

The modulator 113 modulates the signal, and outputs the modulated signal to the radio transmitter 115.

The radio transmitter 115 subjects the signal modulated by the modulator 113 to radio processing such as up converting on the basis of a link changeover signal, and transmits the processed signal from the transmission antenna 117 to the base station 200 or the mobile station 310.

In the wireless relay system according to this embodiment as described above, the relay station 100 can easily change the ratio of the backhaul and the access link. Also, the relay station 100 allocates the subframes which are set to the MBSFN subframes but not used as the backhaul to the mobile station 330 of the LTE-A. For that reason, the relay station 100 can flexibly change the subframes of the backhaul link and the access link, and can shorten a delay of retransmission of the backhaul without additional signaling.

In the above description, the subframes set to the MBSFN subframes by the relay station 100 are determined by the base station 200, and notified the relay station 100 of. However, the present invention is not limited to this configuration. The subframes may be determined by the relay station 100, and notified the base station 200 of.

Incidentally, in the above-mentioned wireless relay system according to the first embodiment, the relay station 100 can easily change the ratio of backhaul and the access link. However, since a change in the ratio of the backhaul and the access link is notified the relay station 100 of from the base station 200, there arises a problem of a difficulty in dealing with an instant change in traffic which is attributable to a reception error of the signal.

For that reason, the relay station 100 transmits a retransmission request to the base station 200 if the relay station 100 finds an error in the signal from the base station 200 by the backhaul. However, since the subframes set to the backhaul are limited, the relay station 100 cannot instantly retransmit the retransmission request. The signals of the backhaul are an assembly of signals addressed to a plurality of mobile stations or signals transmitted by the relay station 100 by a plurality of subframes, and a possibility that the amount of information included in one signal becomes large is high. Accordingly, when the signals of the backhaul are retransmitted, an influence on a variation of the traffic is increased as much.

Also, the signals received from the relay station 100 by the backhaul are signals that are transmitted from the relay station 100 to the mobile station 310 by the access link later. Therefore, if the retransmission occurs by the backhaul, the delay affects a subsequent access link, causing a large influence on a delay between the base station 200 and the mobile stations 310 and 330.

Second Embodiment

Figure 4:
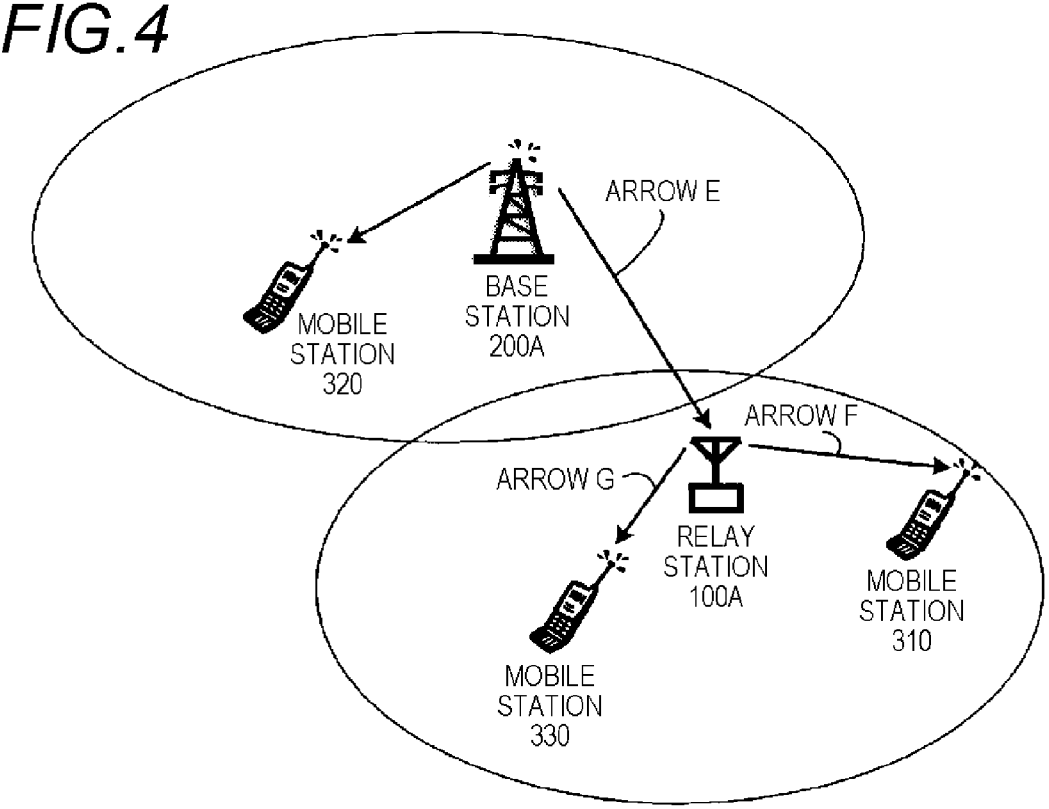
FIG. 4 is a diagram illustrating a wireless relay system according to a second embodiment.

Under the circumstances, as a second embodiment, a description will be given of a wireless relay system that can treat the traffic that instantly changes due to the retransmission with reference to FIGS. 4 to 8. FIG. 4 is a diagram illustrating the wireless relay system according to the second embodiment. In the wireless relay system illustrated in FIG. 4, a relay station 100A is installed between a base station 200A and the mobile stations 310 and 330, and communications (arrows E, F, and G in FIG. 4) between the base station 200A and mobile stations 310, 330 are conducted through the relay station 100A. In this example, because the respective mobile stations are identical with those in the first embodiment, the same mobile stations are denoted by identical reference symbols, and their detailed description will be omitted.

In the wireless relay system illustrated in FIG. 4, a time division relay (TD relay) in which a communication of the backhaul and a communication of an access link of the relay station 100A are divided on a time axis is assumed.

In the wireless relay system illustrated in FIG. 4, the communication is conducted by frequency division multiplexing (FDD).

In the wireless relay system illustrated in FIG. 4, a two-hop relay in which data is transmitted from the base station 200A to the mobile station through the relay station 100A is assumed.

In the wireless relay system illustrated in FIG. 4, a mobile station 320 is a mobile station that is connected to the base station 200A, and the mobile stations 310 and 330 are mobile stations that are connected to the relay station 100A. It is assumed that the mobile station 310 is an LTE mobile station, and the mobile station 330 is an LTE-A mobile station.

In the wireless relay system according to the second embodiment, the relay station 100A stops the communication by the access link, and receives the signal by the backhaul in order to receive the retransmission signal. Upon receiving the retransmission request, the base station 200A relays the retransmission signal to the relay station 100A with the use of the subframe of the access link that has not been set to the backhaul. As the subframe used when the base station 200A relays the retransmission signal, the MBSFN subframe set in the first embodiment is used.

Figure 5:
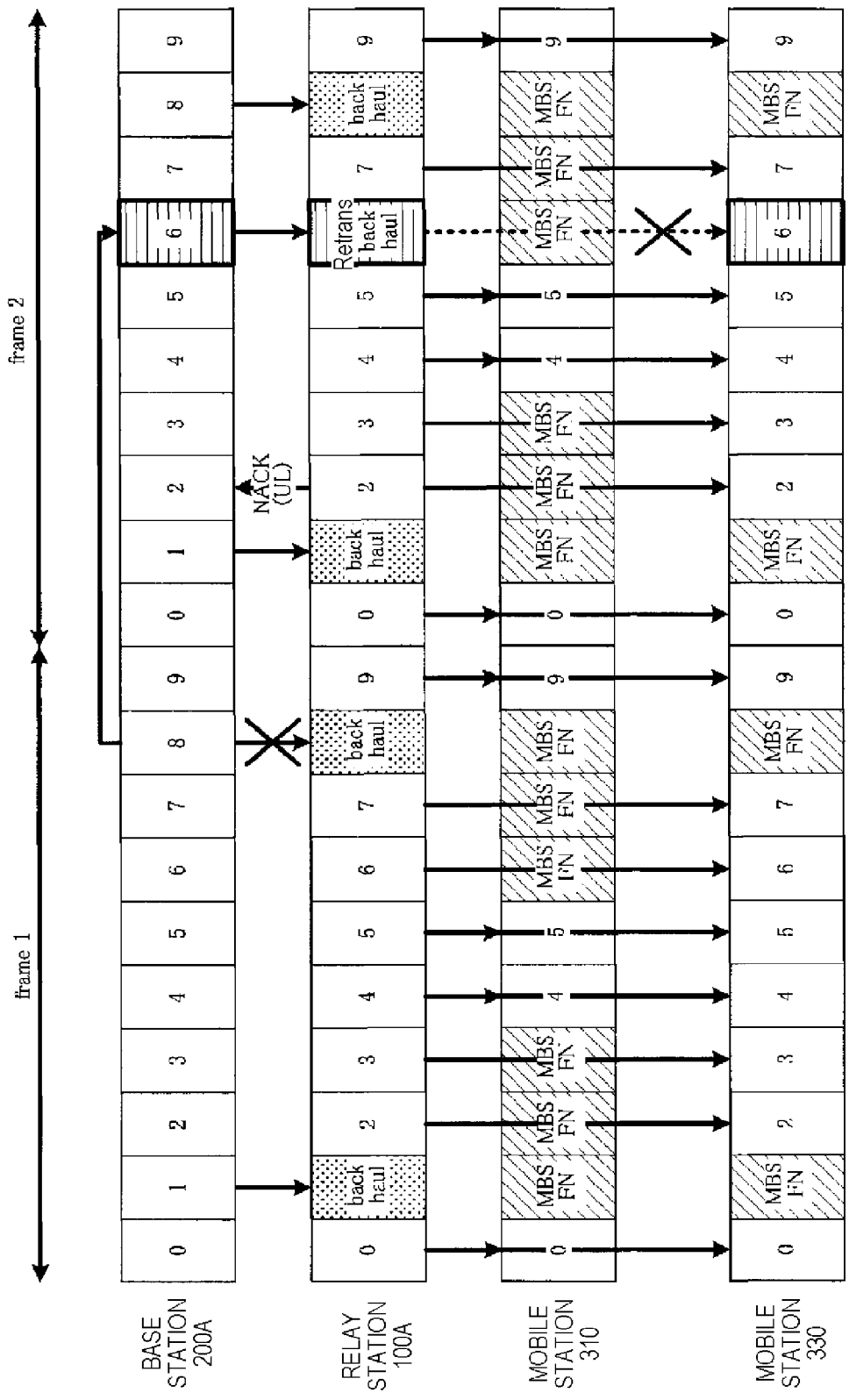
FIG. 5 is a diagram illustrating a setting example of a subframe in a downlink (DL) of the wireless relay system illustrated in FIG. 4.

Subsequently, a description will be given of the operation of the relay station 100A and the base station 200A according to the second embodiment with reference to FIG. 5. FIG. 5 is a diagram illustrating a setting example of the subframe in the downlink (DL) of the wireless relay system illustrated in FIG. 4.

As illustrated in FIG. 5, a frame 1 (Frame 1 in FIG. 5) and a frame 2 (Frame 2 in FIG. 5) in the wireless relay system are configured in the subframes #0 to #9. Also, arrows illustrated in FIG. 5 indicate the subframes of the respective stations which are destinations of signals transmitted from the respective stations. That is, the arrows in FIG. 5 indicate the operation of transmission and reception on the downlink (DL), of the base station 200A, the relay station 100A connected to the base station 200A, the mobile station 320 of the LTE connected to the relay station 100A, and the mobile station 330 of the LTE-A.

In the subframes #8 of the frame 1, the relay station 100A fails to receive the signal from the base station 200A (mark X in FIG. 5). For that reason, at timing of the subframe #2 of the frame 2, the relay station 100A transmits a NACK to the base station 200A. The NACK is transmitted in the band of the uplink (UL). In FIG. 5, transmission timing of the NACK is merely indicated by arrows, and even in the subframe #2 of the frame 2, the relay station 100A can transmit data to the mobile station 320 in the band of the downlink (DL).

Subsequently, when the base station 200A receives the NACK from the relay station 100A in the subframe #2 of the frame 2, the base station 200A transmits the retransmission signal to the relay station 100A in the subframe #6 of the frame 2 after four subframes. In this example, the subframe #6 of the frame 2 is a subframe that is originally set to the backhaul, but a subframe that has been set to the MBSFN subframe.

When the relay station 100A transmits the NACK to the base station 200A in the subframe #2 of the frame 2, the relay station 100A stops allocation the signal to the mobile station 330 of the LTE-A which is connected to the subject relay station 100A in order to receive the retransmission signal from the base station 200A in the subframe #6 after four subframes (a broken arrow in FIG. 5). Then, the relay station 100A switches an operation mode from a transmission mode of the access link to a reception mode of the backhaul in the subframe #6 of the frame 2.

As described above, in this embodiment, with triggering the NACK for requiring the retransmission by the base station 200A by the relay station 100A, the relay station 100A switches an operation mode from a transmission mode of the access link to a reception mode of the backhaul, thereby enabling the resources of the backhaul and the access link to be distributed according to the instant traffic variation caused by the retransmission. When the subframe after four subframes subsequent to the subframe in which the NACK has been transmitted to the base station 200A is not set to the MBSFN subframe, the subframe that is first set to the MBSFN subframe among the subsequent subframes is changed to the backhaul from the access link in the relay station 100A.

<Exception Processing>

In this embodiment, as the subframe that is changed from the access link to the backhaul link, the subframe set to the MBSFN subframe is exemplified. However, the present invention is not limited to this configuration. For example, as another object of the subframes, when the subframe is used as (1) a subframe for transmitting CSI-RS (channel state information reference signal) by the relay station 100A, and as (2) a subframe for transmitting a positioning support signal by the relay station 100A, the relay station 100A may transmit the access link without changing the subframe to the backhaul. For that reason, the mobile station 320 or the mobile station 330 that receives the signal from the relay station 100A can receive the CSI-RS or the positioning support signal.

Also, as the subframe that is changed from the access link to the backhaul, the subframe set to the MBSFN subframe is exemplified. However, the present invention is not limited to this configuration. When the subframe is originally set to the backhaul, the subframe that can be changed to the backhaul among the subsequent subframes may be changed to the backhaul.

Figure 6:
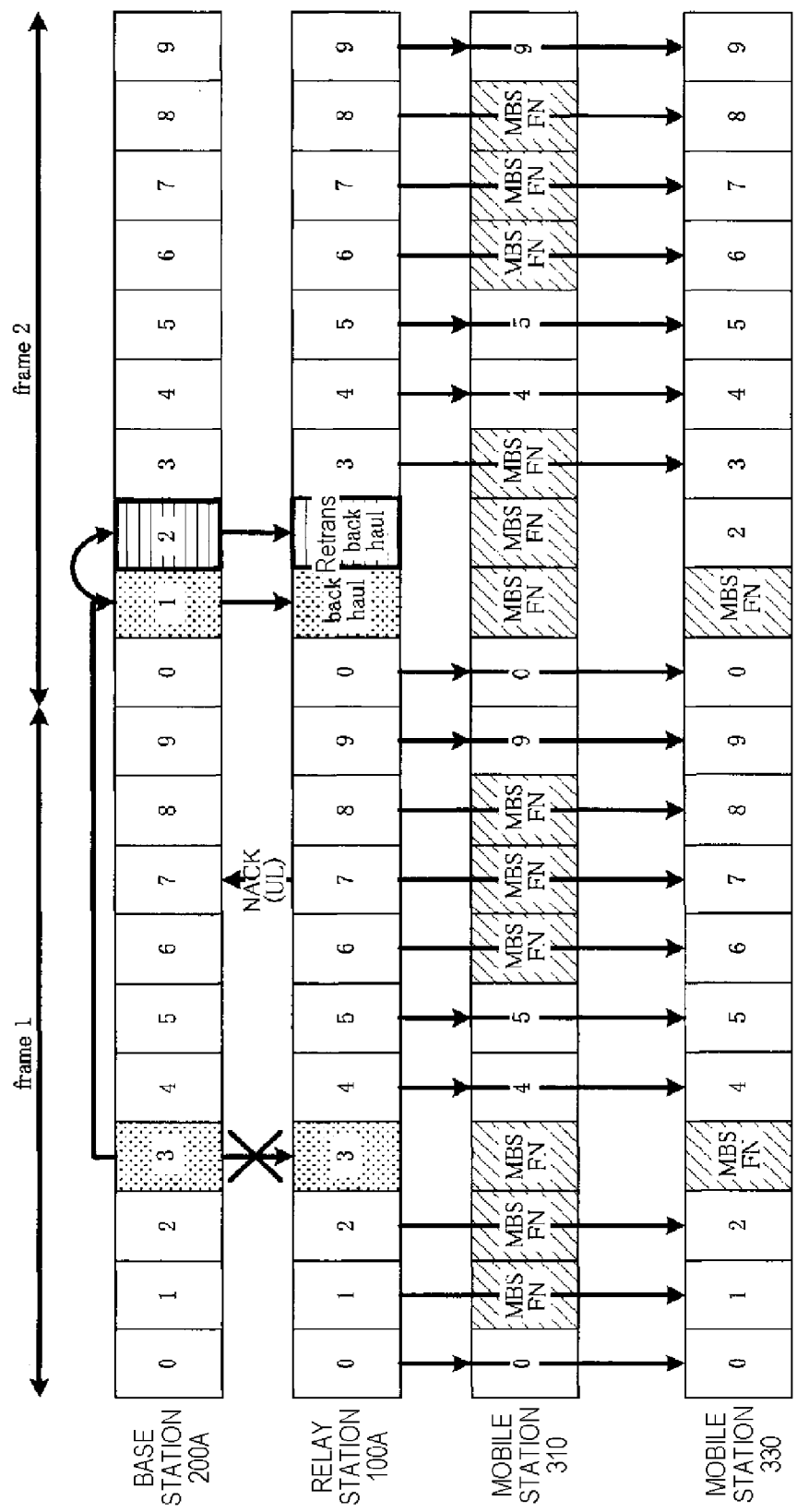
FIG. 6 is a diagram illustrating an example of an exception processing.

Now, an example of the above-mentioned exception processing according to this embodiment will be described with reference to FIG. 6. As illustrated in FIG. 6, the frame 1 (Frame 1 in FIG. 6) and the frame 2 (Frame 2 in FIG. 6) in the wireless relay system according to this embodiment are configured in the subframe #0 to the subframe #9. Also, arrows illustrated in FIG. 6 indicate subframes of the respective stations which are destinations of signals transmitted from the respective stations. That is, the arrows in FIG. 6 indicate the operation of transmission and reception on the downlink (DL), of the base station 200A, the relay station 100A connected to the base station 200A, the mobile station 310 of the LTE connected to the relay station 100A, and the mobile station 330 of the LTE-A.

As illustrated in FIG. 6, in the subframes #3 of the frame 1, the relay station 100A fails to receive the signal (mark X in FIG. 6). For that reason, at timing of the subframe #7 of the frame 1, the relay station 100A transmits the NACK to the base station 200A. The NACK is transmitted in the band of the uplink (UL). In FIG. 6, transmission timing of the NACK is merely indicated by arrows, and even in the subframe #7 of the frame 1, the relay station 100A can transmit data to the mobile station 320 in the band of the downlink (DL).

Subsequently, when the base station 200A receives the NACK from the relay station 100A in the subframe #7 of the frame 1, the base station 200A tries to switch the subframe #1 of the frame 2 after four subframes of the reception of the NACK to the backhaul. However, the subframe #1 of the frame 2 is a subframe that is originally set to the backhaul. For that reason, the base station 200A transmits the signal to the relay station 100A in the subframe #2 of the frame 2 which is a subsequent candidate. The relay station 100 also conducts the same calculation, and switches the subframe #2 of the frame 2 to the backhaul (retransmission backhaul in FIG. 6).

Figure 7:
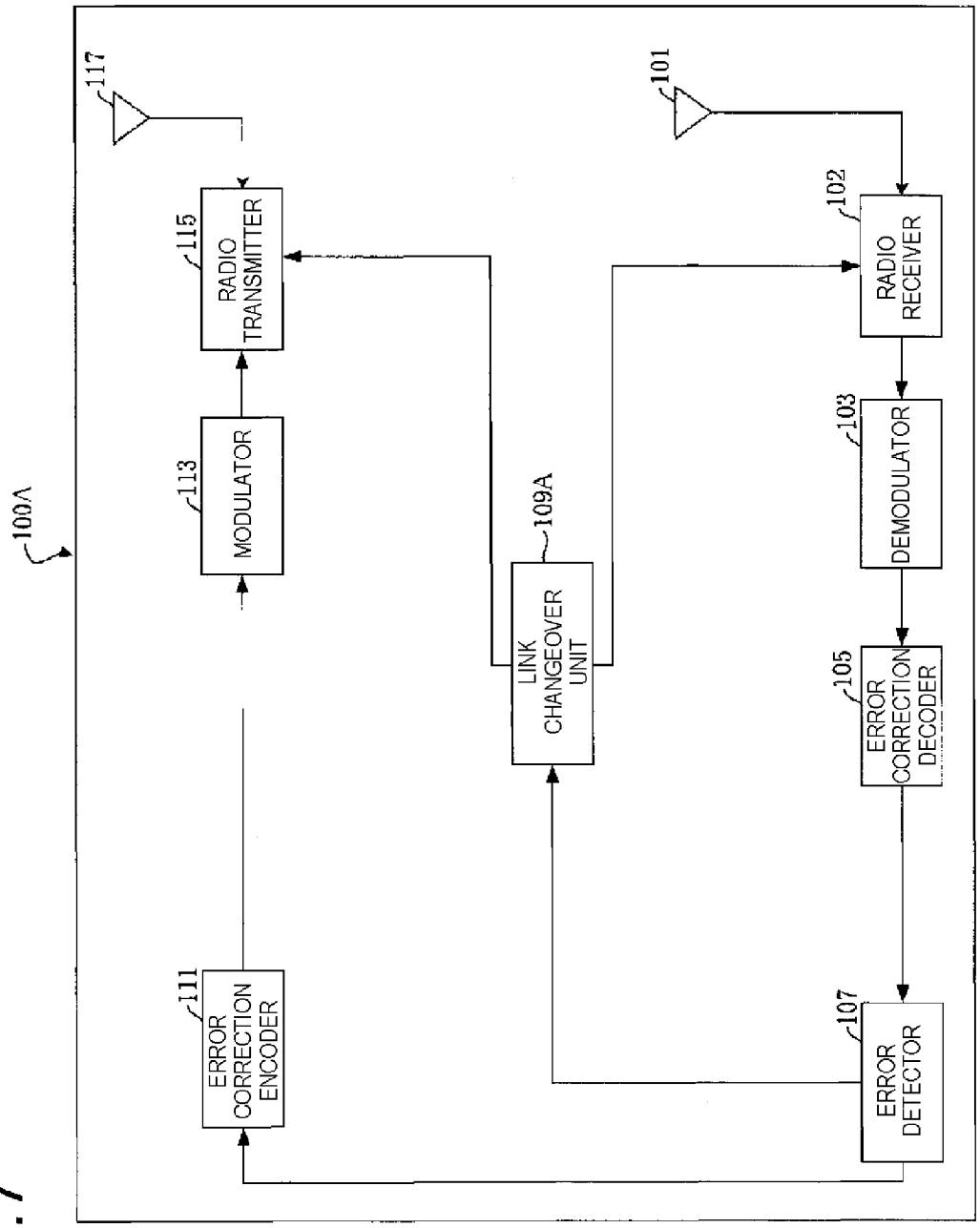
FIG. 7 is a block diagram illustrating a configuration of a relay station 100A.

Now, a description will be given of a configuration of the relay station 100A according to the second embodiment with reference to FIG. 7. FIG. 7 is a block diagram illustrating a configuration of the relay station 100A. The relay station 100A illustrated in FIG. 7 includes a reception antenna 101, a radio receiver 102, a demodulator 103, an error correction decoder 105, an error detector 107, a link changeover unit 109A, an error correction encoder 111, a modulator 113, a radio transmitter 115, and a transmission antenna 117. In this example, a difference of the relay station 100 illustrated in FIG. 3 from the relay station 100A illustrated in FIG. 7 resides in the link changeover unit 109A.

The radio receiver 102 receives a signal from the base station 200A through the reception antenna 101, subjects the signal to radio processing such as down converting, and outputs the converted signal to the demodulator 103.

The demodulator 103 demodulates the signal subjected to the radio processing by the radio receiver 102, and outputs the demodulated signal to the error correction decoder 105.

The error correction decoder 105 decodes the signal demodulated by the demodulator 103, and outputs the demodulated signal to the error detector 107.

The error detector 107 detects whether there is an error in the signal decoded by the error correction decoder 105, or not, and outputs an error detection result to the link changeover unit 109A. Also, the error detector 107 stops relaying the signal if the error is detected, and outputs the signal to the error correction encoder 111 if no error is detected.

The link changeover unit 109A conducts link changeover determination according to a link changeover determination processing flow that will be described later, and outputs a link changeover signal for switching between the access link and the backhaul to the radio transmitter 115.

<Link Changeover Determination Processing Flow>

Figure 8:
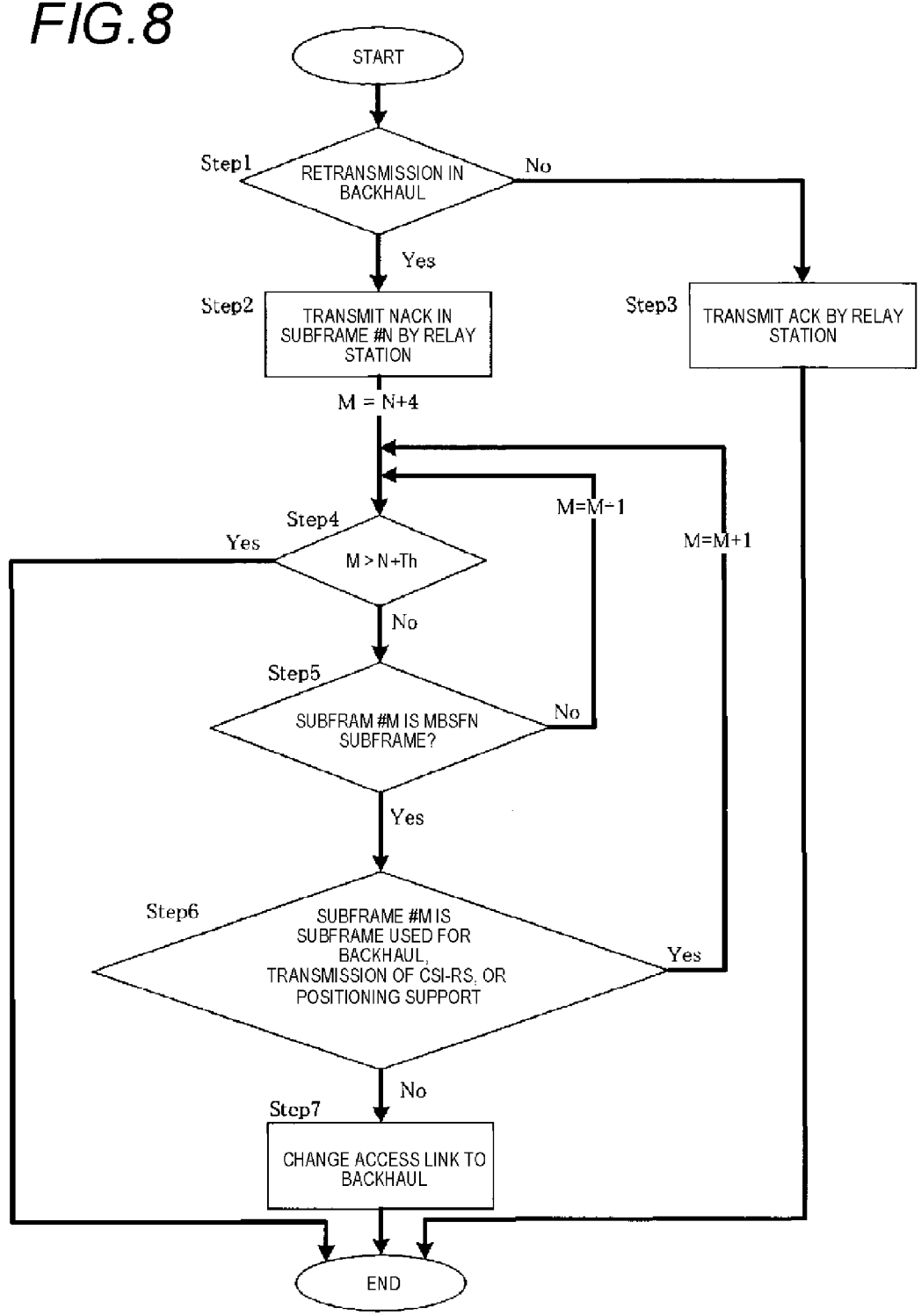
FIG. 8 is a diagram illustrating a link changeover determination processing flow.

A description will be given of a link changeover determination processing flow of the link changeover unit 109A with reference to FIG. 8. FIG. 8 is a diagram illustrating a link changeover determination processing flow of the link changeover unit 109A.

In Step 1, the processing is transited to Step 2 if retransmission occurs in the backhaul, and transited to Step 3 if no retransmission occurs in the backhaul.

In Step 2, the relay station 100A transmits the NACK to the base station 200A by a subframe #N. A retransmission candidate subframe #M is set as M=N+4, and transited to Step 4. M is subframe number of the retransmission candidate subframe #M, and N is a subframe number of the subframe #N.

In Step 3, the relay station 100A transmits the NACK to the base station 200A in the subframe #N, and completes the link changeover determination processing flow.

In Step 4, it is determined whether the subframe number M of the subframe #M which is the retransmission candidate subframe is larger than N+Th, or not. Then, if M is larger than N+Th (yes), in other words, if the retransmission candidate subframe #M is a subframe after N by Th or more, a change of the access link and the backhaul is stopped. Then, the link changeover determination processing flow is completed.

Further, if the subframe number M of the subframe #M which is the retransmission candidate subframe is smaller than N+Tn (no), the processing is transited to Step S5.

In Step 5, it is determined whether the subframe #M which is the retransmission candidate subframe is set to the MBSFN subframe, or not. If the retransmission candidate subframe #M is set to the MBSFN subframe, the processing is transited to Step 6. If the retransmission candidate subframe #M is not set to the MBSFN subframe, the subframe number M of the subframe #M which is the retransmission candidate subframe is incremented by 1, and the processing is transited to Step 4.

In Step 6, the retransmission candidate subframe #M is any subframe of (1) a subframe set to the backhaul, (2) a subframe set to the transmission of the CSI-RS, and (3) a subframe set to the positioning support, the subframe number M of the subframe #M which is the retransmission candidate subframe is incremented by 1, and the processing is transited to Step 4. If the retransmission candidate subframe #M does not correspond to any one of the above subframes (1) to (3), the processing is transited to Step 7.

In Step 7, the relay station 100A changes the access link to the backhaul.

Returning to FIG. 7, the configuration of the relay station 100A according to the second embodiment will be described. The error correction encoder 111 subjects the signal to error correction encoding, and outputs the encoded signal to the modulator 113.

The modulator 113 modulates the signal, and outputs the signal to the radio transmitter 115.

The radio transmitter 115 subjects the signal modulated by the modulator 113 to radio processing such as up converting on the basis of a link changeover signal, and transmits the processed signal from the transmission antenna 117 to the base station 200A or the mobile station 310A.

In the wireless relay system according to this embodiment as described above, the relay station 100A can easily change the ratio of the backhaul and the access link. Also, the relay station 100A allocates the subframes which are set to the MBSFN subframes but not used as the backhaul to the mobile station 330 of the LTE-A. For that reason, the relay station 100A can flexibly change the subframes of the backhaul link and the access link, and can shorten a delay of retransmission of the backhaul without additional signaling.

Also, in the wireless relay system according to this embodiment, with triggering the NACK for requiring the retransmission by the base station 200A by the relay station 100A, the relay station 100A switches an operation mode from a transmission mode of the access link to a reception mode of the backhaul, thereby enabling the resources of the backhaul and the access link to be distributed according to the instant traffic variation caused by the retransmission.

In the wireless relay system according to this embodiment, the base station 200A transmits the retransmission signal after four subframes of the transmission of the NACK by the relay station 100A. However, the present invention is not limited to this configuration. For example, it may be defined that the base station 200A transmits the retransmission signal after five subframes, three subframes, or two subframes of the transmission of the NACK by the relay station 100A. Information on after how many subframes the retransmission signal is transmitted is shared between the base station 200A and the relay station 100A in advance.

In the wireless relay system according to this embodiment, the base station 200A may transmit the retransmission signal after four subframes of the transmission of the NACK by the relay station 100A in the case of second or subsequent retransmission.

In the wireless relay system according to this embodiment, the relay station 100A does not always transmit the retransmission signal in the subframe that changes from the access link to the backhaul. That is, the relay station 100A receives the retransmission signal if there is an allocation to the subject relay station 100A in the subframe that changes from the access link to the backhaul, and does not receive the retransmission signal if there is no allocation to the subject relay station 100A. Also, the base station 200A determines whether the retransmission signal is transmitted in the subframe that changes from the access link to the backhaul, according to the priority of the signals to be transmitted to the mobile station 310 which is connected to the subject base station 200A, or another relay station other than the relay station 100A.

In the wireless relay system according to this embodiment, if the backhaul subframe exists between the subframe in which the relay station 100A has transmitted the retransmission signal and the subframe switched therefrom, the relay station 100A may transmit the retransmission signal by that backhaul subframe, and transmit a new signal by the switched subframe.

Third Embodiment

Figure 9:
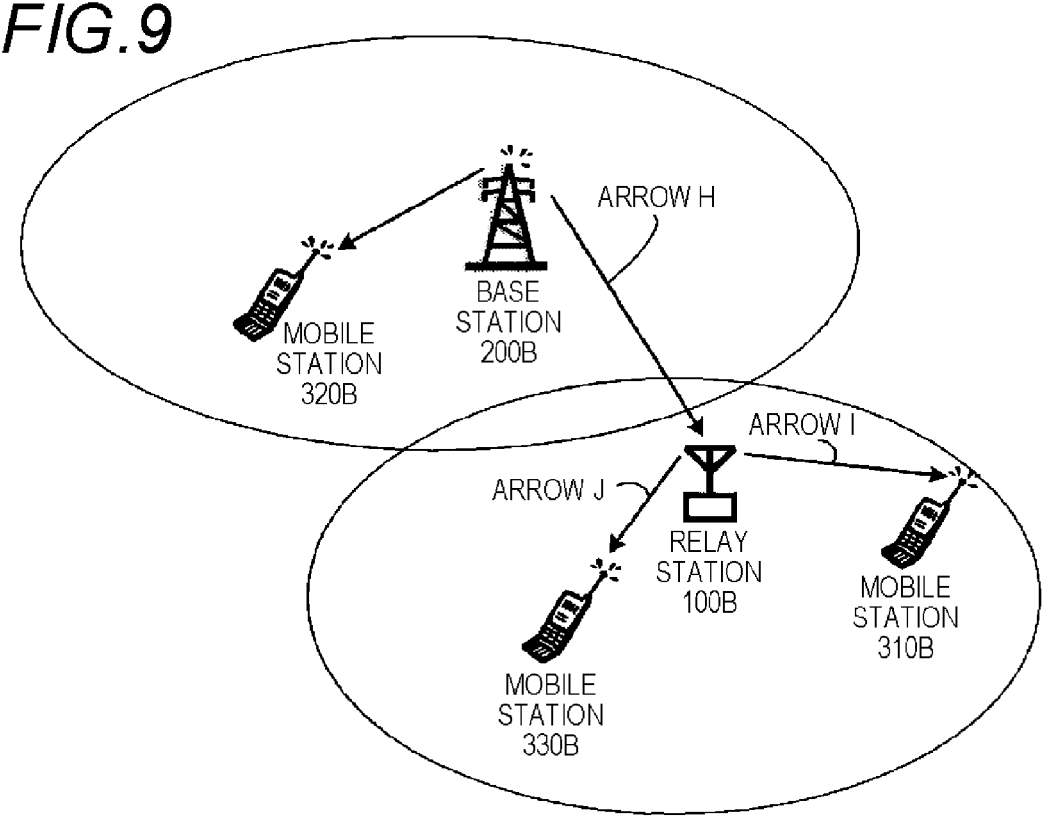
FIG. 9 is a diagram illustrating a wireless relay system according to a third embodiment.

Subsequently, a description will be given of a wireless relay system according to a third embodiment of the present invention with reference to FIGS. 9 to 12. FIG. 9 is a diagram illustrating the wireless relay system according to the third embodiment. In the wireless relay system illustrated in FIG. 9, a relay station 100B is installed between a base station 200B and the mobile station, and communications (arrows H, I, and J in FIG. 9) between the base station 200B and mobile stations 310B, 330B are conducted through the relay station 100B.

In the wireless relay system illustrated in FIG. 9, a time division relay (TD relay) in which a communication of the backhaul and a communication of an access link of the relay station 100B are divided on a time axis is assumed.

In the wireless relay system illustrated in FIG. 9, the communication is conducted by frequency division multiplexing (FDD).

In the wireless relay system illustrated in FIG. 9, a two-hop relay in which data is transmitted from the base station 200B to the mobile station through the relay station 100B is assumed.

In the wireless relay system illustrated in FIG. 9, a mobile station 320B is a mobile station that is connected to the base station 200B, and the mobile stations 310B and 330B are mobile stations that are connected to the relay station 100B. It is assumed that the mobile station 310B is an LTE mobile station, and the mobile station 330B is an LTE-A mobile station.

In the wireless relay system according to the third embodiment, the relay station 100B notifies the mobile station 310B or 330B of link changeover when switching from the access link to the backhaul. For that reason, the mobile station 310B or 330B can recognize that there is no allocation to the backhaul by receiving a notification of the changeover.

As in the second embodiment, when the relay station 100B finds that there occurs a changeover from the access link to the backhaul, the relay station 100B notifies the mobile station 310B or 330B of the link changeover.

Upon receiving the link changeover, the mobile station 310B or 330B conduct any one of the following operation (1)

to (5) in the subframe that changes the link. As the operation (1), the mobile station 310B or 330B stops measuring the line quality of a cell of the relay station 100B. As the operation (2), the mobile station 310B or 330B stops the operation of receiving the allocation information of the DL signal (stop blind determination). As the operation (3), the mobile station 310B or 330B measures the line of a cell of another connected relay station other than the relay station 100B. As the operation (4), the mobile station 310B or 330B measures reception timing of a cell of another connected relay station other than the relay station 100B, and generates a position measurement signal. As the operation (5), the mobile station 310B or 330B stops the reception, and comes to a sleep state.

The link changeover signals to be transmitted to the mobile station 310B or 330B by the relay station 100B are allocated and transmitted to control signal areas to be transmitted to the mobile station 310B or 330B by the relay station 100B. The control signal areas may include OFDM symbols #0 to #2 in the subframes, or OFDM symbols #0 to #3 depending on the bandwidth.

In this example, the relay station 100B may transmit the link changeover signal with the use of an area (normally, an area for transmitting ACK/NACK for UL) for transmitting PHICH. Also, the relay station 100B may transmit the link changeover signal to an area of common control signals. In any event, the area to which the link changeover signal is transmitted is commonly determined in advance by the relay station 100B and the mobile station 310B or 330B.

Figure 10:
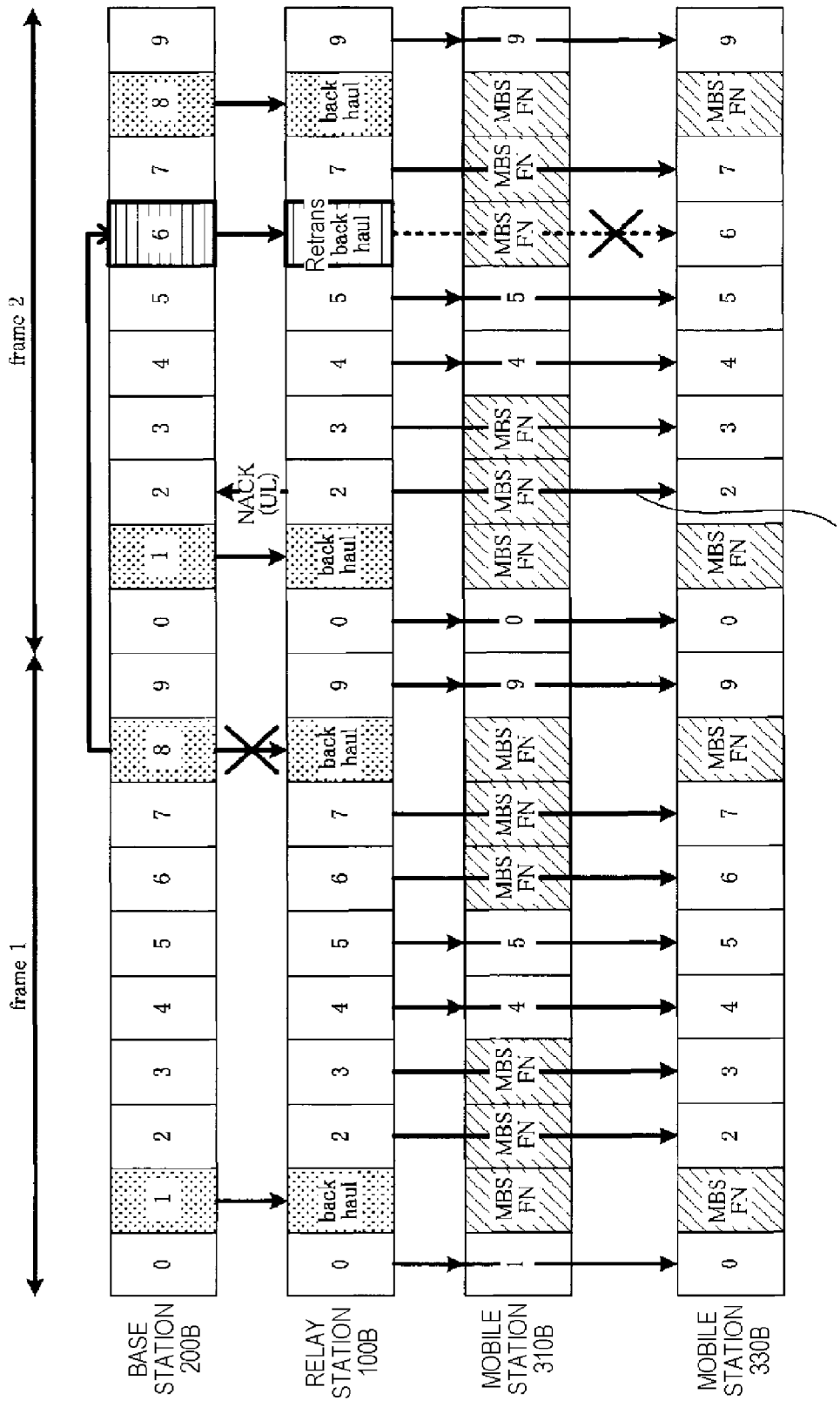
FIG. 10 is a diagram illustrating a setting example of a subframe in a downlink (DL) of the wireless relay system illustrated in FIG. 9.

Subsequently, a description will be given of the operation of the relay station 100B and the base station 200B in the third embodiment with reference to FIG. 10. FIG. 10 is a diagram illustrating a setting example of the subframe in the downlink (DL) of the wireless relay system illustrated in FIG. 9.

As illustrated in FIG. 10, the frame 1 (Frame 1 in FIG. 10) and the frame 2 (Frame 2 in FIG. 10) in the wireless relay system are configured in the subframes #0 to #9. Also, arrows illustrated in FIG. 10 indicate the subframes of the respective stations which are destinations of signals transmitted from the respective stations. That is, the arrows in FIG. 10 indicate the operation of transmission and reception on the downlink (DL), of the base station 200B, the relay station 100B connected to the base station 200B, the mobile station 310B of the LTE connected to the relay station 100B, and the mobile station 330B of the LTE-A.

In the subframes #8 of the frame 1, the relay station 100B fails to receive the signal from the base station 200B (mark X in FIG. 10). For that reason, at timing of the subframe #2 of the frame 2, the relay station 100B transmits the NACK to the base station 200B. The NACK is transmitted in the band of the uplink (UL). In FIG. 10, transmission timing of the NACK is merely indicated by arrows, and even in the subframe #2 of the frame 2, the relay station 100B can transmit data to the mobile station 320B in the band of the downlink (DL).

Subsequently, when the base station 200B receives the NACK from the relay station 100B in the subframe #2 of the frame 2, the base station 200B transmits the retransmission signal to the relay station 100B in the subframe #6 of the frame 2 after four subframes. In this example, the subframe #6 of the frame 2 is a subframe that is originally set to the backhaul, but a subframe that has been set to the MBSFN subframe.

When the relay station 100B transmits the NACK to the base station 200B in the subframe #2 of the frame 2, the relay station 100B stops the signal from being allocated to the mobile station 330B of the LTE-A which is connected to the subject relay station 100B in order to receive the retransmission signal from the base station 200B in the subframe #6 after four subframes (a broken arrow in FIG. 10). Then, the relay station 100A switches from a transmission mode of the access link to a reception mode of the backhaul in the subframe #6 of the frame 2.

The relay station 100B notifies the mobile station 330B of the link changeover by the same subframe in which the retransmission request has been transmitted to the relay station 100B in the subframe #2 of the frame 2.

The mobile station 330 that has received a notification of the link changeover recognizes that the subframe #6 of the frame 2 has been changed to the backhaul. In this embodiment, the relay station 100B transmits the link changeover notification to the mobile station 330B by the same subframe as the subframe in which the retransmission request is transmitted to the base station 200B. However, the present invention is not limited to this configuration.

Also, there is a method of giving notification of the subframe number M of the subframe #M to be switched. When the subframe #M to be switched is notified of, the subframe number M to be switched is notified by the changeover signal. In this case, the subframe number for transmitting the changeover signal is not particularly limited. Further, the mobile station 330B finds the subframe to be switched without calculating the subframes to be switched, taking exception processing into account.

Also, when the subframe number #M to be switched is not notified of, there are a method (former) of defining what subframe before the changeover the changeover signal is to be transmitted by, and a method (latter) of transmitting the changeover signal to the mobile station 330B at timing when the retransmission signal is transmitted to the base station 200B as illustrated in the example. In the former, the mobile station 330B that has received the changeover signal recognizes that there is no signal from the relay station 100B after the determined subframe. In the latter, the mobile station 330B conducts the same calculation as that of the relay station 100B and the base station 200B, and understands what subsequent subframe has no signal from the relay station 100B.

Figure 11:
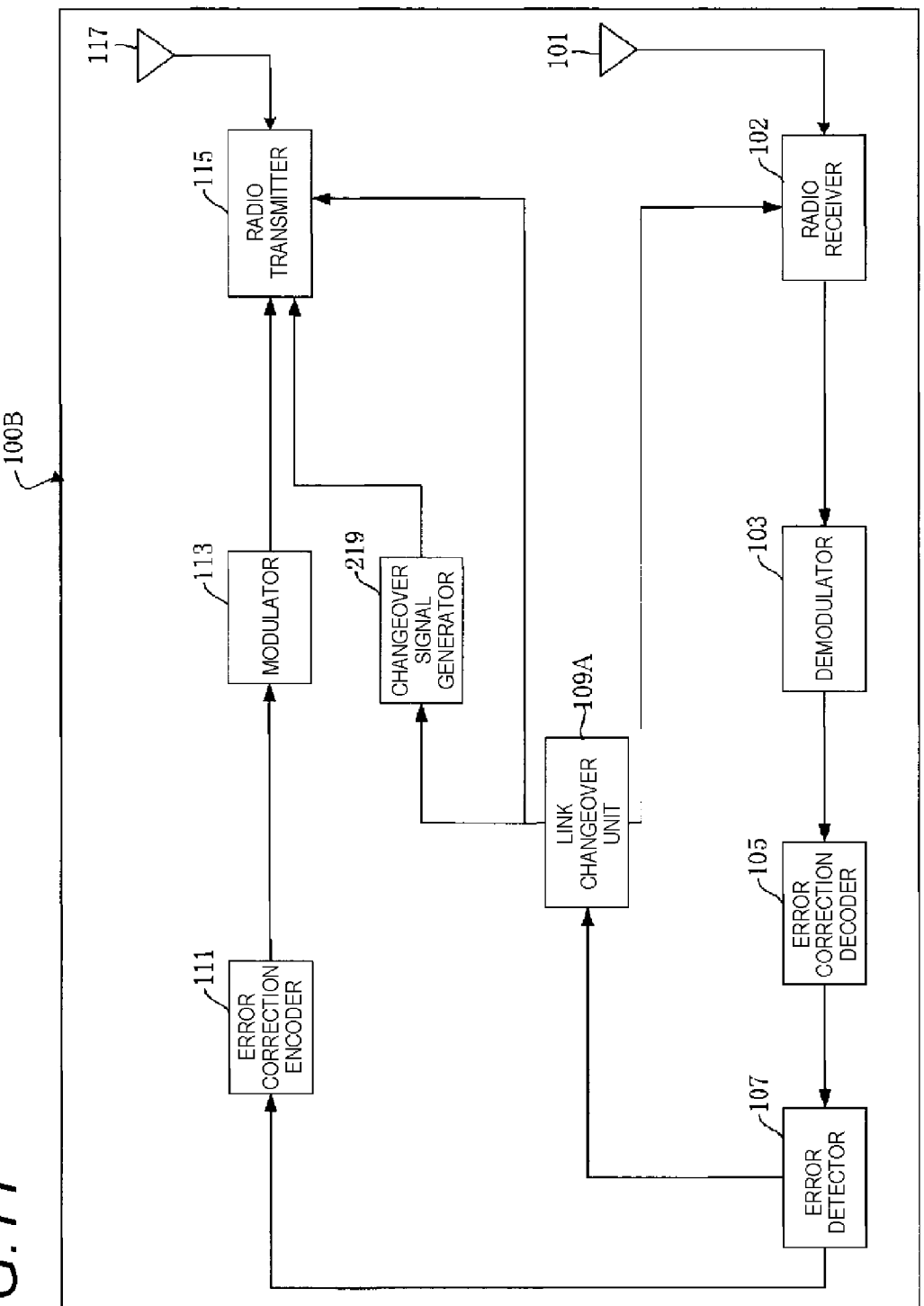
FIG. 11 is a block diagram illustrating a configuration of a relay station 100B.

Subsequently, a description will be given of a configuration of the relay station 100B with reference to FIG. 11. FIG. 11 is a block diagram illustrating a configuration of the relay station 100B. The relay station 100B illustrated in FIG. 11 includes a reception antenna 101, a radio receiver 102, a demodulator 103, an error correction decoder 105, an error detector 107, a link changeover unit 109A, an error correction encoder 111, a modulator 113, a radio transmitter 115, a transmission antenna 117, and a changeover signal generator 219.

In this example, a difference of the relay station 100B illustrated in FIG. 11 from the relay station 100A illustrated in FIG. 7 resides in that the changeover signal generator 219 is newly provided. The other configurations are common to those of FIG. 7, and therefore their detailed description will be omitted.

The changeover signal generator 219 enters a result determined by the link changeover unit 109A, and determines that switching from the access link to the backhaul is conducted according to the determination result. Then, the changeover signal generator 219 generates a link changeover signal for notifying the mobile station 330B which subframe the link is switched in, and outputs the link changeover signal to the radio transmitter 115. Then, the radio transmitter 115 transmits the link changeover signal to the mobile station 330B through the transmission antenna 117.

Figure 12:
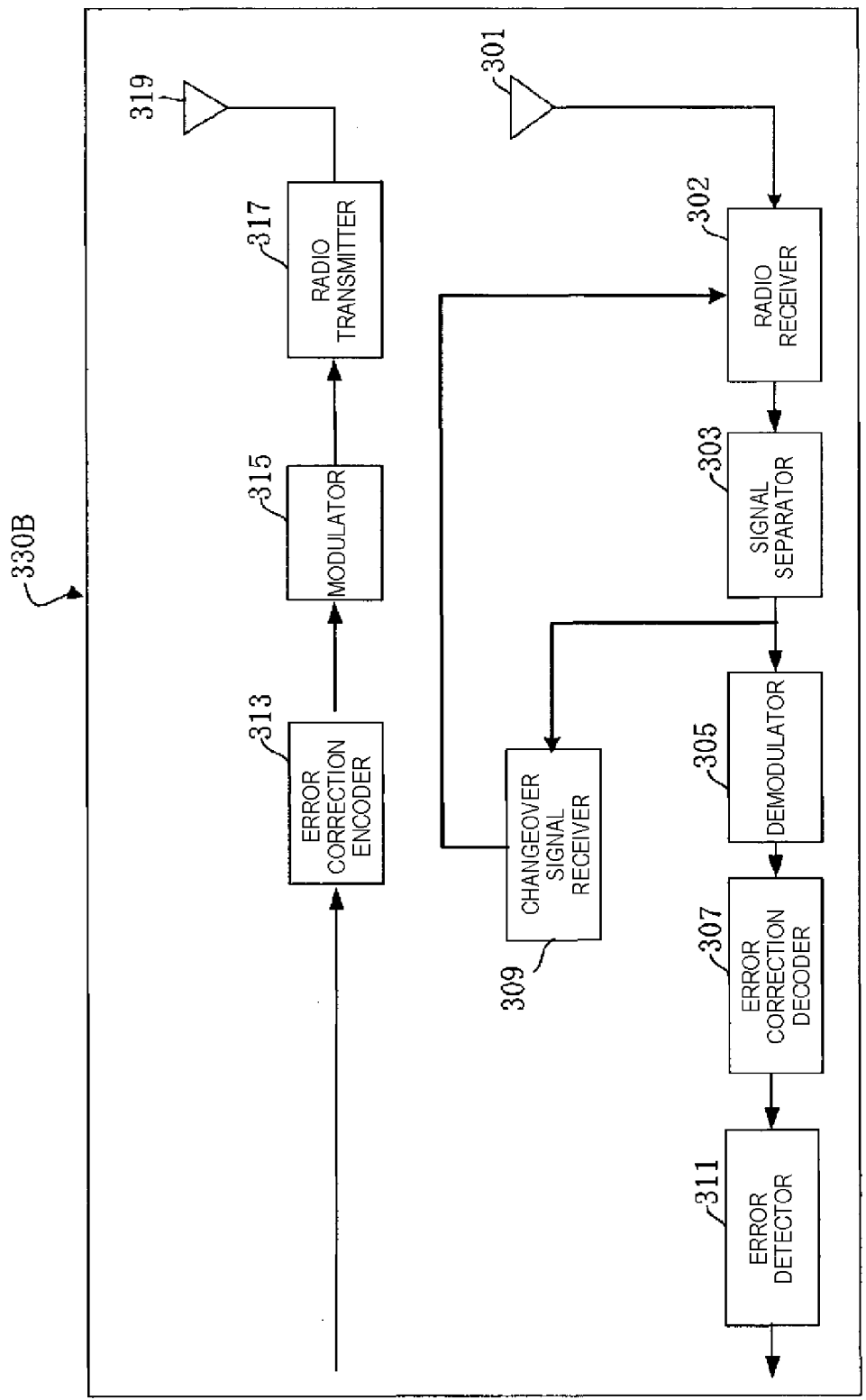
FIG. 12 is a block diagram illustrating a configuration of a mobile station 330B.
Figure 13:
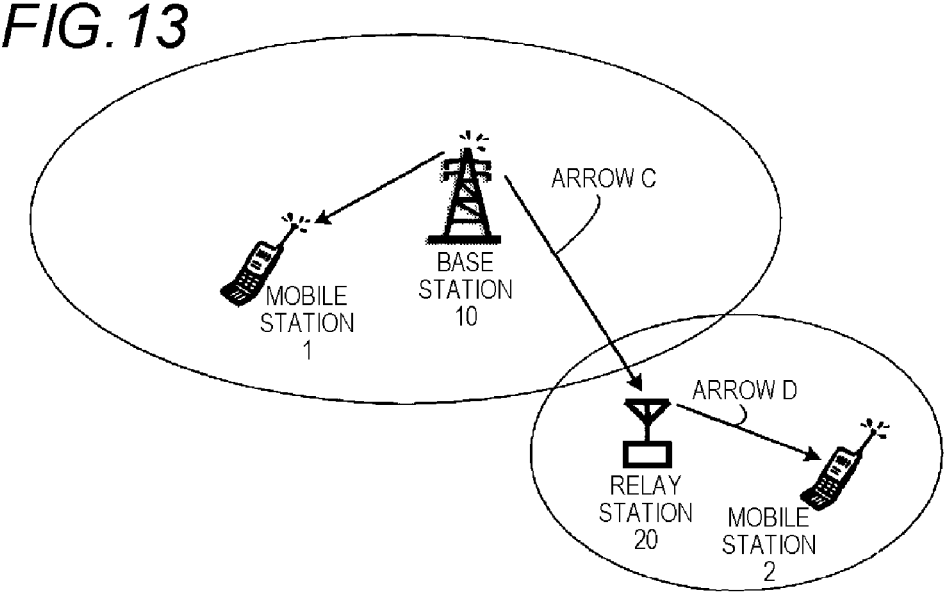
FIG. 13 is a diagram illustrating a conventional wireless communication system.
Figure 14:
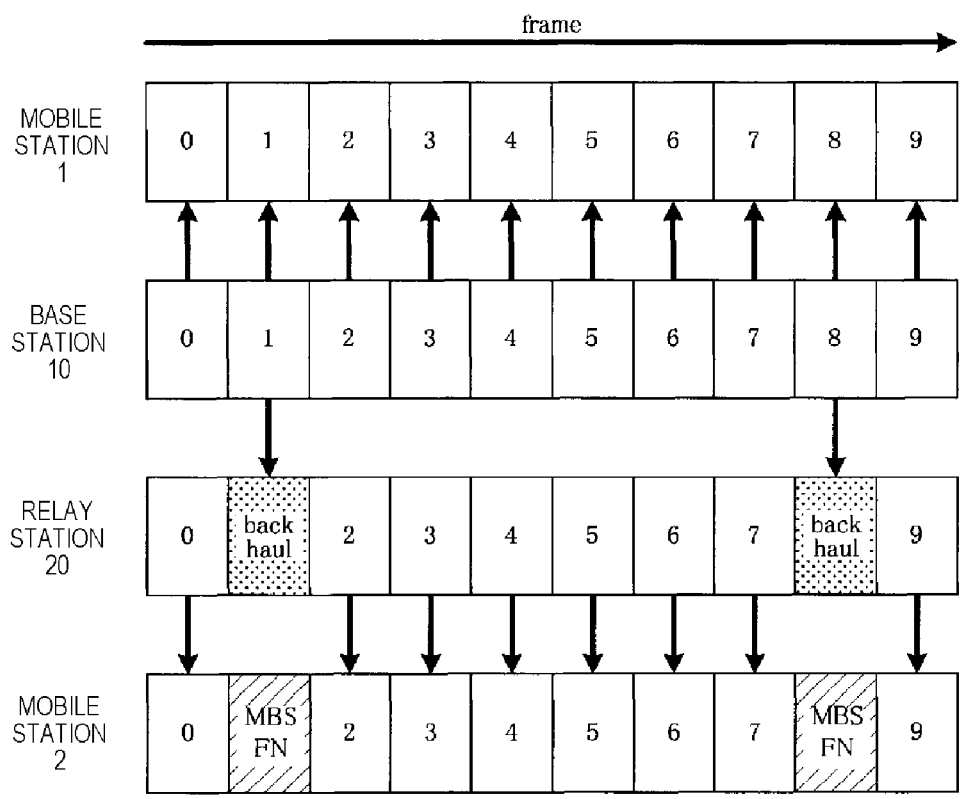
FIG. 14 is a diagram illustrating a setting example of a conventional MBSFN subframe.

Subsequently, a configuration of the mobile station 330B will be described with reference to FIG. 12. FIG. 12 is a block diagram illustrating the configuration of the mobile station 330B. The mobile station 330B illustrated in FIG. 12 includes a reception antenna 301, a radio receiver 302, a signal separator 303, a demodulator 305, an error correction decoder 307, a changeover signal receiver 309, an error detector 311, an error correction encoder 313, a modulator 315, a radio transmitter 317, and a transmitting 319.

The radio receiver 302 receives a signal from the base station 200B or the relay station 100B through the reception antenna 101, subjects the received signal to radio processing such as down converting, and outputs the processed signal to the signal separator 303.

The signal separator 303 separates data received from the relay station 100B and the link changeover signal from each other, outputs the received data to the demodulator 305, and outputs the link changeover signal to the changeover signal receiver 309.

When the changeover signal receiver 309 receives an instruction for switching the subframe on the basis of the link changeover signal, the changeover signal receiver 309 notifies the radio receiver 302 that the existing subframe is changed from the access link subframe to the backhaul subframe.

The demodulator 305 demodulates the data from the relay station 100B separated in the signal separator 303, and outputs the data to the error correction decoder 307.

The error correction decoder 307 decodes the data demodulated in the demodulator 305, and outputs the decoded data to the error detector 311.

The error detector 311 detects whether there is an error in the signal decoded in the error correction decoder 307, or not, by a CRC.

The error correction encoder 313 subjects the signal to error correction encoding, and outputs the encoded signal to the modulator 315.

The modulator 315 modulates the signal, and outputs the modulated signal to the radio transmitter 317.

The radio transmitter 317 subjects the signal modulated in the modulator 113 to up converting, and transmits the converted signal from the transmission antenna 117 to the base station 200B or the relay station 100B.

In the wireless relay system according to this embodiment as described above, the relay station 100B can easily change the ratio of the backhaul and the access link. Also, the relay station 100B allocates the subframes which are set to the MBSFN subframes but not used as the backhaul to the mobile station 330B of the LTE-A. For that reason, the relay station 100B can flexibly change the subframes of the backhaul link and the access link, and can shorten a delay of retransmission of the backhaul without additional signaling.

Also, in the wireless relay system according to this embodiment, with the NACK for requiring the retransmission by the base station 200B by the relay station 100B as a trigger, the relay station 100B switches from a transmission mode of the access link to a reception mode of the backhaul, thereby enabling the resources of the backhaul and the access link to be distributed according to the instant traffic variation caused by the retransmission.

In the wireless relay system according to this embodiment, the base station 200B transmits the retransmission signal after four subframes of the transmission of the NACK by the relay station 100B. However, the present invention is not limited to this configuration. For example, it may be defined that the base station 200B transmits the retransmission signal after five subframes, three subframes, or two subframes of the transmission of the NACK by the relay station 100B. Information on after how many subframes the retransmission signal is transmitted is shared between the base station 200B and the relay station 100B in advance.

In the wireless relay system according to this embodiment, the base station 200B may transmit the retransmission signal after four subframes of the transmission of the NACK by the relay station 100A in the case of second or subsequent retransmission.

In the wireless relay system according to this embodiment, the relay station 100B does not always transmit the retransmission signal in the subframe that changes from the access link to the backhaul. That is, the relay station 100B receives the retransmission signal if there is an allocation to the subject relay station 100B in the subframe that changes from the access link to the backhaul, and does not receive the retransmission signal if there is no allocation. Also, the base station 200B determines whether the retransmission signal is transmitted in the subframe that changes from the access link to the backhaul, according to the priority of the signals to be transmitted to the mobile station 320 which is connected to the subject base station 200B, or another relay station other than the relay station 100B.

In the wireless relay system according to this embodiment, if the backhaul subframe exists between the subframe in which the relay station 100B has transmitted the retransmission signal and the subframe switched therefrom, the relay station 100B may transmit the retransmission signal by that backhaul subframe, and transmit a new signal by the switched subframe.

Whether the link changeover method according to the second embodiment or the link changeover method described in the third embodiment may be determined according to the characteristics of data. The characteristics of data include the amount of data, and the acceptable amount of delay.

The amount of data as the characteristics of data may be based on a TBS (trans block size) or the number of allocated RB. If a threshold value is determined, and the TBS or the number of RB is equal to or larger than the threshold value, the above link change method may be applied, and if the TBS or the number of RB is smaller than the threshold value, the above link change method may not be applied. With this operation, since unnecessary changeover can be restricted, the number of changeover can be reduced. Also, if the TBS or the number of RB is smaller than the threshold value, a possibility that the signal can be retransmitted in the subframe next allocated to the backhaul is higher, and therefore there is no need to switch the operation to reception.

In this example, the acceptable amount of delay as the characteristics of data may be based on QoS. If the amount of delay of data is small, the second or third embodiment may be applied. If the data is large in the amount of delay, those embodiments may not be applied. More specifically, changeover can be conducted according to QCI (QoS class identifier) that is a signal indicative of QoS, nine types (3GPP TS23.203 Table 6.1.7). Similarly, in this case, a threshold value is provided as with the amount of data, if the QoS that is the threshold value or larger is obtained, those embodiments can be applied, and if the QoS is smaller than threshold value, those embodiments cannot be applied. Also, the changeover can be conducted by Bearer ID that enables the type of data to be found. With this configuration, since the unnecessary changeover can be restricted, the changeover can be controlled according to the priority.

Further, a value of the threshold value used for the characteristics of data is set to a default value in advance, and only when the threshold value is changed, the threshold value can be notified the relay station of from the base station under the control.

The above embodiments have been described as the antenna, however, the same is applicable even to an antenna port. The antenna port means a logical antenna configured by one or plural physical antennas. That is, the antenna port does not always means one physical antenna, but may mean an array antenna configured by plural antennas. For example, in the LTE, the number of physical antennas configuring the antenna port is not specified, but the antenna port is specified as the minimum unit by which the base station can transmit different reference signals. Also, the antenna port may be specified as the minimum unit by which the weighting of a precoding vector is multiplied.

Also, the respective functional blocks used in the description of the above respective embodiments are typically realized as an LSI that is an integrated circuit. Each of those functional blocks may be integrated into one chip, or parts or all of those functional blocks may be integrated into one chip. The LSI in this example may be called an IC, a system LSI, a super LSI, or an ultra LSI depending on a difference of integration.

Also, a technique of the integrated circuit is not limited to the LSI, but may be realized by a dedicated circuit or a general-purpose processor. There may be used an FPGA (field programmable gate array) that is programmable after manufacturing an LSI, or a reconfigurable processor that can reconfigure the connection or setting of a circuit cell within the LSI.

Further, if a technology for integration circuit which is substituted for the LSI appears due to the development of the semiconductor technology or another technology derived therefrom, the functional blocks may be integrated by that technology. A biotechnology may be applied.

The present application is based on Japanese Patent Application No. 2009-182527 filed on Aug. 5, 2009, and content thereof is incorporated herein by reference.

INDUSTRIAL APPLICABILITY

The wireless communication device, the signal relay method, and the signal allocation method according to the present invention can flexibly change the subframes of the backhaul link and the access link, and are useful as the wireless communication device and the wireless communication method.

REFERENCE SIGNS LIST 100, 100A, 100B: relay station
101: reception antenna
103: demodulator
105: error correction decoder
107: error detector
109: link changeover processor
109A: link changeover unit
111: error correction encoder
113: modulator
115: radio transmitter
117: transmission antenna
200, 200A, 200B: base station
219: changeover signal generator
301: reception antenna
303: signal separator
305: demodulator
307: error correction decoder
309: changeover signal receiver
310, 310B: mobile station (LTE)
313: error correction encoder
315: modulator
317: radio transmitter
319: transmission antenna
320, 320B: mobile station
330, 330B: mobile station (LTE-A)

The invention claimed is:

1. A wireless communication device for relaying a signal between a base station and a mobile station, the wireless communication device comprising:
a receiver that is configured to receive the signal from the base station or the mobile station;
a transmitter that is configured to transmit the signal to the base station or the mobile station; and
a changeover unit that is configured to switch an operation mode to a reception mode for receiving the signal from the base station, or to a transmission mode for transmitting the signal to the mobile station, wherein
the changeover unit is configured to switch the operation mode from the transmission mode of an access link to the mobile station to the reception mode of a backhaul link from the base station in a subframe that is originally assigned for the transmission mode and is set to an MBSFN subframe by the wireless communication device among subframes subsequent to a subframe in which the changeover unit transmits a NACK to the base station for requiring a retransmission by the base station, wherein the base station notifies the changeover unit of the subframe set to an MBSFN subframe during which the retransmission will occur prior to the retransmission.

2. The wireless communication device according to claim 1, wherein
the wireless communication device is configured to notify the base station of a subframe to which no data is allocated to the mobile station in the subframe in which the changeover unit transmits to the base station a NACK for requiring the retransmission by the base station.

3. The wireless communication device according to claim 1, wherein
the changeover unit is configured to switch the operation mode from the transmission mode to the reception mode when an amount of data transmitted from the base station is larger than a predetermined threshold value, in the subframe set to the MBSFN subframe by the wireless communication device among subframes subsequent to the subframe in which the changeover unit transmits to the base station a NACK for requiring the retransmission by the base station.

4. The wireless communication device according to claim 1, wherein
the changeover unit is configured to switch the operation mode from the transmission mode to the reception mode when an acceptable delay amount of data transmitted from the base station is smaller than a predetermined threshold value, in the subframe set to the MBSFN subframe by the wireless communication device among subframes subsequent to the subframe in which the changeover unit transmits to the base station a NACK for requiring the retransmission by the base station.

5. A signal relay method for relaying a signal between a base station and a mobile station, the signal relay method comprising:
switching from a transmission mode for transmitting the signal to the base station or the mobile station to a reception mode for receiving the signal from the base station or the mobile station in a subframe that is originally assigned for the transmission mode and is set to an MBSFN subframe among subframes subsequent to a subframe in which a NACK for requiring a retransmission by the base station is transmitted, wherein the base station notifies the changeover unit of the subframe set to an MBSFN subframe during which the retransmission will occur prior to the retransmission.

6. The wireless communication device according to claim 1, wherein
the receiver receives a retransmission signal from the base station in the subframe determined by the changeover unit, wherein the retransmission signal corresponds to the NACK transmitted from the wireless communication device.

7. The signal relay method according to claim 5, further comprising:
receiving a retransmission signal from the base station in the subframe as set, wherein the retransmission signal corresponds to the NACK transmitted to the base station.

* * * * *